(12) United States Patent
Sleeman et al.

(10) Patent No.: US 10,146,351 B2
(45) Date of Patent: Dec. 4, 2018

(54) POSITION-SENSING AND FORCE DETECTION PANEL

(71) Applicant: Atmel Corporation, San Jose, CA (US)

(72) Inventors: Peter Sleeman, Waterlooville (GB); John Stanley Dubery, Basingstoke (GB)

(73) Assignee: Atmel Corporation, Chandler, AZ (US)

( * ) Notice: Subject to any disclaimer, the term of this patent is extended or adjusted under 35 U.S.C. 154(b) by 200 days.

(21) Appl. No.: 14/981,510

(22) Filed: Dec. 28, 2015

(65) Prior Publication Data

US 2016/0117036 A1     Apr. 28, 2016

Related U.S. Application Data

(63) Continuation of application No. 12/959,166, filed on Dec. 2, 2010, now Pat. No. 9,223,445.

(51) Int. Cl.
| | |
|---|---|
| *G06F 3/041* | (2006.01) |
| *G06F 3/044* | (2006.01) |
| *G01L 5/22* | (2006.01) |
| *G01L 1/20* | (2006.01) |
| *G01L 1/14* | (2006.01) |

(52) U.S. Cl.
CPC ............. *G06F 3/0414* (2013.01); *G01L 1/14* (2013.01); *G01L 1/205* (2013.01); *G01L 5/228* (2013.01); *G06F 3/044* (2013.01); *G06F 3/0416* (2013.01); *G06F 2203/04105* (2013.01)

(58) Field of Classification Search
CPC ............ G01L 1/14; G01L 1/205; G01L 5/228
See application file for complete search history.

(56) References Cited

U.S. PATENT DOCUMENTS

| | | | |
|---|---|---|---|
| 4,581,587 A | 4/1986 | Powell | |
| 5,008,497 A * | 4/1991 | Asher | G06F 3/0414 |
| | | | 178/18.05 |
| 6,492,979 B1 * | 12/2002 | Kent | G06F 3/0414 |
| | | | 178/18.01 |
| 7,663,607 B2 | 2/2010 | Hotelling | |
| 7,875,814 B2 | 1/2011 | Chen | |
| 7,920,129 B2 | 4/2011 | Hotelling | |

(Continued)

FOREIGN PATENT DOCUMENTS

WO    WO 2012/129247    9/2012

OTHER PUBLICATIONS

Kyung, Ki-Uk et al., "wUbi-Pen : Windows Graphical User Interface Interacting with Haptic Feedback Stylus," *SIGGRAPH* Los Angeles, California, Aug. 2008.

(Continued)

*Primary Examiner* — Chun-Nan Lin
(74) *Attorney, Agent, or Firm* — Baker Botts L.L.P.

(57) ABSTRACT

In one embodiment, a sensor includes a voltage driver operable to provide an alternating voltage and an integrator circuit. The sensor further includes a first variable resistance element coupled to a first output of the voltage driver and an input of the integrator circuit. The integrator circuit is operable to measure a parameter of the first variable resistance element over a period of time. The sensor further includes circuitry operable to determine, based on the measured parameter, an amount of force applied to a touch sensing panel.

10 Claims, 4 Drawing Sheets

(56) References Cited

U.S. PATENT DOCUMENTS

| | | |
|---|---|---|
| 8,031,094 B2 | 10/2011 | Hotelling |
| 8,031,174 B2 | 10/2011 | Hamblin |
| 8,040,326 B2 | 10/2011 | Hotelling |
| 8,049,732 B2 | 11/2011 | Hotelling |
| 8,179,381 B2 | 5/2012 | Frey |
| 2002/0000979 A1* | 1/2002 | Furuhashi .............. G06F 3/045 345/173 |
| 2002/0101399 A1* | 8/2002 | Kubo .................. G02F 1/13338 345/104 |
| 2002/0163509 A1* | 11/2002 | Roberts ................ G06F 3/0414 345/173 |
| 2005/0012398 A1 | 1/2005 | Goggin et al. |
| 2006/0158433 A1 | 7/2006 | Serban et al. |
| 2008/0158178 A1 | 7/2008 | Hotelling et al. |
| 2009/0273573 A1 | 11/2009 | Hotelling |
| 2009/0315854 A1 | 12/2009 | Matsuo |
| 2010/0123677 A1 | 5/2010 | Brown et al. |
| 2010/0156845 A1 | 6/2010 | Kim et al. |
| 2010/0201652 A1 | 8/2010 | Caliskan et al. |
| 2011/0141052 A1 | 6/2011 | Bernstein et al. |
| 2011/0193819 A1 | 8/2011 | Sherman |
| 2011/0215914 A1 | 9/2011 | Edwards |
| 2011/0273396 A1 | 11/2011 | Chung, II |
| 2012/0026124 A1 | 2/2012 | Li et al. |
| 2012/0139864 A1 | 6/2012 | Sleeman |
| 2012/0194476 A1 | 8/2012 | Lee et al. |
| 2012/0242588 A1 | 9/2012 | Myers |
| 2012/0242592 A1 | 9/2012 | Rothkopf |
| 2012/0243151 A1 | 9/2012 | Lynch |
| 2012/0243719 A1 | 9/2012 | Franklin |

OTHER PUBLICATIONS

Lee, Johnny C. et al., "Haptic Pen: A Tactile Feedback Stylus for Touch Screens," *UIST '04*, vol. 6, Issue 2, Santa Fe, New Mexico, Oct. 2004.

Song, Hyunyoung et al., "Grips and Gestures on a Multi-Touch Pen," *CHI 2011, Session: Flexible Grips & Gestures*, Vancouver, BC, Canada, May 2011.

Tan, Eng Chong et al., "Application of Capacitive Coupling to the Design of an Absolute-Coordinate Pointing Device," IEEE Transactions on Instrumentation and Measurement, vol. 54, No. 5. Oct. 2005.

Peter Sleeman, U.S. Appl. No. 12/959,166, Non-Final Rejection dated Oct. 19, 2012.

Peter Sleeman, U.S. Appl. No. 12/959,166, Response to Non-Final Rejection dated Feb. 19, 2013.

Peter Sleeman, U.S. Appl. No. 12/959,166, Non-Final Rejection dated May 24, 2013.

Peter Sleeman, U.S. Appl. No. 12/959,166, Response to Non-Final Rejection dated Oct 24, 2013.

Peter Sleeman, U.S. Appl. No. 12/959,166, Applicant Initiated Interview Summary dated Apr. 11, 2013.

Peter Sleeman, U.S. Appl. No. 12/959,166, Applicant Summary of Interview dated Nov. 5, 2013.

Peter Sleeman, U.S. Appl. No. 12/959,166, Non-Final Rejection dated Jan. 8, 2014.

Peter Sleeman, U.S. Appl. No. 12/959,166, Response to Non-Final Rejection dated May 8, 2014.

Peter Sleeman, U.S. Appl. No. 12/959,166, Non-Final Rejection dated Aug. 12, 2014.

Peter Sleeman, U.S. Appl. No. 12/959,166, Response to Non-Final Rejection dated Jan. 12, 2015.

Peter Sleeman, U.S. Appl. No. 12/959,166, Final Rejection dated May 20, 2015.

Peter Sleeman, U.S. Appl. No. 12/959,166, RCE and Amendment dated Jul. 20, 2015.

Peter Sleeman, U.S. Appl. No. 12/959,166, Advisory Action dated Aug. 6, 2015.

Peter Sleeman, U.S. Appl. No. 12/959,166, RCE, Aug. 10, 2015.

Peter Sleeman, U.S. Appl. No. 12/959,166, Notice of Allowance dated Aug. 25, 2015.

U.S. Appl. No. 61/454,894, filed Mar. 21, 2011, Rothkopf.

U.S. Appl. No. 61/454,936, filed Mar. 21, 2011, Myers.

U.S. Appl. No. 61/454,950, filed Mar. 21, 2011, Lynch.

* cited by examiner

POSITION-SENSING AND FORCE DETECTION PANEL

RELATED APPLICATION

This application is a continuation, under 35 U.S.C. § 120, of U.S. patent application Ser. No. 12/959,166, filed Dec. 2, 2010, which is incorporated herein by reference.

BACKGROUND

A position sensor can detect the presence and location of a touch by a finger or by an object, such as a stylus, within an area of an external interface of the position sensor. In a touch sensitive display application, the position sensor enables, in some circumstances, direct interaction with information displayed on the screen rather than indirectly via a mouse or touchpad. Position sensors can be attached to or provided as part of devices with a display. Examples of displays include, but are not limited to, computers, personal digital assistants (PDAs), satellite navigation devices, mobile telephones, portable media players, portable game consoles, public information kiosks, and point of sale systems. Position sensors have also been used as control panels on various appliances.

There are a number of different types of position sensors. Examples include, but are not limited to, resistive touch screens, surface acoustic wave touch screens, capacitive touch screens, and the like. A capacitive touch screen, for example, may include an insulator coated with a transparent conductor in a particular pattern. When an object, such as a finger or a stylus, touches the surface of the screen there is a change in capacitance. This change in capacitance is sent to a controller for processing to determine the position where the touch occurred.

In a mutual capacitance configuration, for example, an array of conductive drive electrodes or lines and conductive sense electrodes or lines can be used to form a touch screen having capacitive nodes. A node may be formed at each intersection of a drive electrode and a sense electrode. The electrodes cross at the intersections but are separated by an insulator so as to not make electrical contact. In this way, the sense electrodes are capacitively coupled with the drive electrodes at the intersection nodes. A pulsed or alternating voltage applied on a drive electrode will therefore induce a charge on the sense electrodes that intersect with the drive electrode. The amount of induced charge is susceptible to external influence, such as from the proximity of a nearby finger. When an object approaches the surface of the screen, the capacitance change at every individual node on the grid can be measured to determine the location or position of the object.

SUMMARY

Disclosed are various examples of a touch sensor that includes exemplary force detection circuitry. The force detection circuitry can be used to determine an amount of force applied to the sensor.

BRIEF DESCRIPTION OF THE FIGURES

The figures depict one or more implementations in accordance with the present teachings, by way of example only, not by way of limitation. In the figures, like reference numerals refer to the same or similar elements.

DETAILED DESCRIPTION

In the following detailed description, numerous specific details are set forth by way of examples in order to explain the relevant teachings. In order to avoid unnecessarily obscuring aspects of the present teachings, those methods, procedures, components, and/or circuitry that are well-known to one of ordinary skill in the art have been described at a relatively high level.

Reference now is made in detail to the examples illustrated in the accompanying figures and discussed below.

Figure 1:
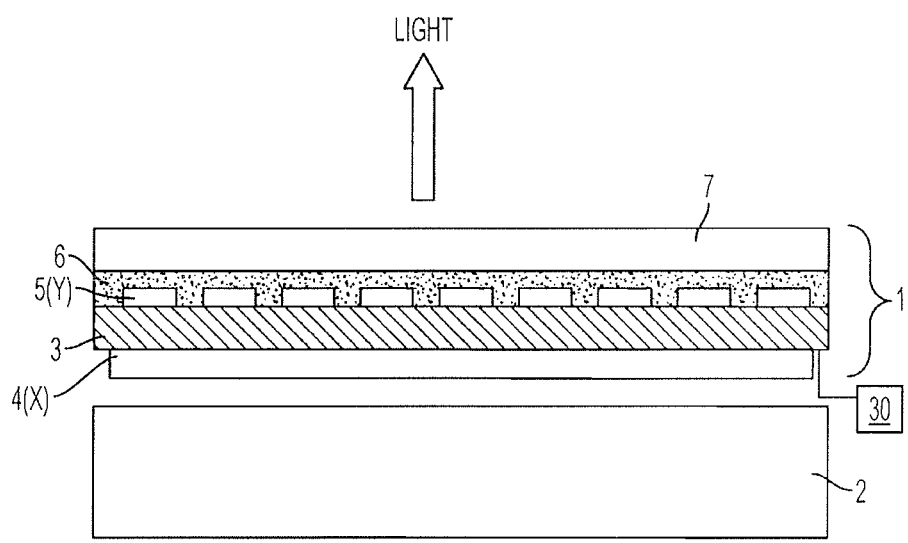
FIG. 1 illustrates schematically a cross-sectional view of a touch sensitive panel.

A display may be overlaid with a touch position-sensing panel, to implement a touch sensitive display device. The display may include various forms. Examples include, but are not limited to liquid crystal displays such as an active matrix liquid crystal display, an electroluminescent display, an electrophoretic display, a plasma display, cathode-ray display, an OLED display, or the like. It will be appreciated that light emitted from the display should be able to pass through the position-sensing panel with minimal absorption or obstruction FIG. 1 illustrates an exemplary touch position-sensing panel 1 which overlies a display 2. Although the force sensing may be used in touch sensors implementing other types of touch sensing, for discussion purposes, the drawing shows an example of a structure that may be used to implement a mutual capacitance type touch sensitive panel.

In the illustrated example, the panel 1 includes a substrate 3 having a surface on each side. The panel 1 includes a first number of electrodes 4(X) and a second number of electrodes 5(Y) provided on the opposite surfaces of the substrate 3. The substrate 3 is also provided adjacent to the display 2 such that one electrode 4(X) is between the display 2 and the substrate 3. An air gap is formed between the display 2 and the first electrode 4(X). A transparent adhesive layer 6 is between the second electrode 5(Y) and a transparent covering sheet 7.

In other examples, the touch position-sensing panel 1 may have a second substrate (not shown). With a second substrate, a touch position-sensing panel may have a transparent panel, a first adhesive layer on the panel, a first electrode layer forming first electrodes, a first substrate, a second adhesive layer, a second electrode layer forming second electrodes, and the second substrate. In such an example, the first conductive electrode layer is attached to the first substrate and the second conductive electrode layer is attached to the second substrate.

Returning to the illustrated example of FIG. 1, substrate 3, which forms a core of the exemplary touch sensitive position-sensing panel 1, can be formed from a transparent, non-conductive material such as glass or a plastic. Examples of suitable plastic substrate materials include, but are not limited to Polyethylene terephthalate (PET), Polyethylene Naphthalate (PEN), or polycarbonate (PC).

In the mutual capacitance example, electrodes 4(X) are drive electrodes provided on one surface of the substrate 3, and electrodes 5(Y) are sense electrodes provided on the opposing surface of the substrate 3. Capacitive sensing channels are formed at the capacitive coupling nodes which exist in the localized regions surrounding where the first and second electrodes 4(X) and 5(Y) cross over each other and are separated by the non-conductive substrate 3.

Transparent covering sheet 7 is provided over the substrate 3 and electrodes 5(Y) and may be joined thereto using various methods and materials. One exemplary implementation is a pressure-sensitive adhesive. In one example, the covering sheet 7 may be glass, polycarbonate, or PMMA.

Indium-tin-oxide (ITO) is an example of a clear conductive material that can be used to form either one or both sets of electrodes 4(X) and 5(Y) in the example of FIG. 1. Alternatively, any other clear conductive material may be used, such as other inorganic and organic conductive materials, such as Antimony-tin-oxide (ATO), tin oxide, PEDOT or other conductive polymers, carbon nanotube or metal nanowire impregnated materials, and the like. Further, opaque metal conductors may be used such as a conductive mesh, which may be of copper, silver or other conductive materials.

Figure 2:
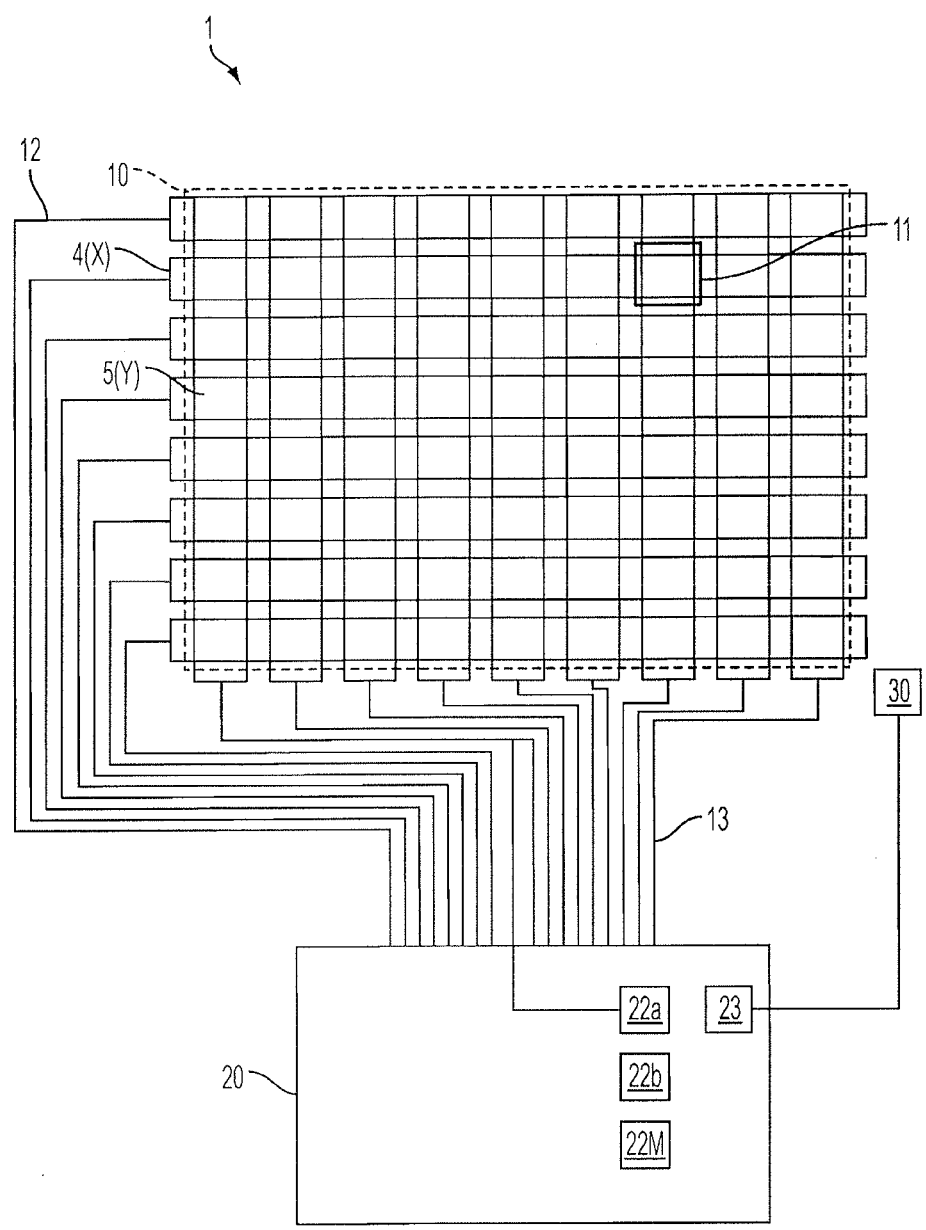
FIG. 2 illustrates schematically a plan view of conductors of the touch sensitive position-sensing panel of FIG. 1 together with a controller of a touch sensitive panel.

With reference to FIG. 2, drive electrodes 4(X) and sense electrodes 5(Y) are formed by solid areas of ITO. Sensing area 10 of the position sensing panel 1, denoted by the dotted line in FIG. 2, encompasses a number of the intersections 11 formed by the drive electrodes 4(X) and sense electrodes (5)Y. In the example, the gaps between adjacent X electrode bars are made narrow. This may enhance the ability of the electrodes 4(X) to shield against noise arising from the underlying display 2 shown in FIG. 1. In some examples, 90% or more of the sensing area 10 is covered by ITO. In an example like that shown in FIG. 2, the gap between adjacent drive electrodes 4(X) may 200 microns or less.

In one example, each drive electrode 4(X) forms channels with a number of the sense electrodes 5(Y) on an adjacent plane. As mentioned previously, there are intersections 11 where the drive electrodes 4(X) cross over the sense electrodes 5(Y).

A drive electrode connecting line 12 is in communication with a respective drive electrode 4(X). A sense electrode connecting line 13 is in communication with a respective sense electrode 5(Y). The patterns of the connecting lines are shown by way of an example only. The drive electrode connecting lines 12 and the sense electrode connecting lines 13 are connected to a control unit 20.

In some examples, the change in capacitance at the node formed at each intersection 11 of drive electrode 4(X) and sense electrode 5(Y) when an object touches the surface of the panel 1 can be sensed by the control unit 20. The control unit 20 applies pulsed or alternating voltages to the drive electrodes 4(X) through the drive electrode connecting lines 12. The control unit 20 measures the amount of charge induced on the sense electrodes 5(Y) through the sense electrode connecting lines 13. The control unit 20 determines that a touch has occurred and the location of the touch based upon the changes in capacitance sensed at one or more of the nodes 11.

In some examples, the amount of charge induced on a sense electrode 5(Y) can be measured by a current integrator circuit 22 incorporated in the control unit 20. The current integrator circuit 22 can measure the accumulated charge on a capacitor at fixed time intervals. The exemplary controller 20 includes a number "n" of current integrators 22a, 22b, . . . 22n and a processor 23. Some of these integrators are used in the processing of signals from the sensing channels to detect touch on the touch position-sensing panel 1.

Some touch sensor applications may take advantage of a measurement of the amount of force applied to the touch position-sensing panel 1. For such an application of the touch sensor, a force sensor can be associated with the touch position-sensing panel 1 and controller 20. The force sensor, in some examples, measures the amount of force applied to the transparent covering sheet 7 of the touch position-sensing panel 1. The force sensor may be used to quantify or distinguish between different types of touch events. For example, the force sensor can measure the amount of force applied and cause the execution of a first function if the force is below or equal to a threshold. The force sensor can also measure the amount of force applied and cause the execution of a second function if the force exceeds the threshold.

With reference back to FIG. 1, a resistive force sensitive element 30 can be used to measure the amount of force applied to the panel. In one example, the resistive force sensitive element 30 can be arranged between the touch position-sensing panel 1 and a supporting structure (not shown). In another example, the touch position-sensing panel 1 is incorporated in a portable device with the resistive force sensitive element 30 arranged between the touch position-sensing panel 1 and a housing of the device.

The resistive force sensitive element 30, for example, may be formed of a Quantum Tunneling Composite material (QTC). The DC resistance of the QTC material varies in relation to applied force. In one example, the force sensitive element 30 can be formed by printing an ink containing the QTC material.

With reference back to FIG. 2, in some examples, the resistive force sensitive element 30 can modulate the flow of current into a current integrator circuit 22 of the control unit 20. The control unit 20 can include one or more current integrator circuits 22 that are not used in touch sensing operations. One exemplary controller 20 is the mXT224 sold by Atmel Corporation, of San Jose Calif. Using such a controller 20 facilitates force sensing by using existing circuitry of the control unit 20. Thus, force sensing can be achieved, in some examples, without any additional dedicated electronic conditioning circuitry such as bias networks, amplifiers, analogue to digital converters, and the like.

Figure 3:
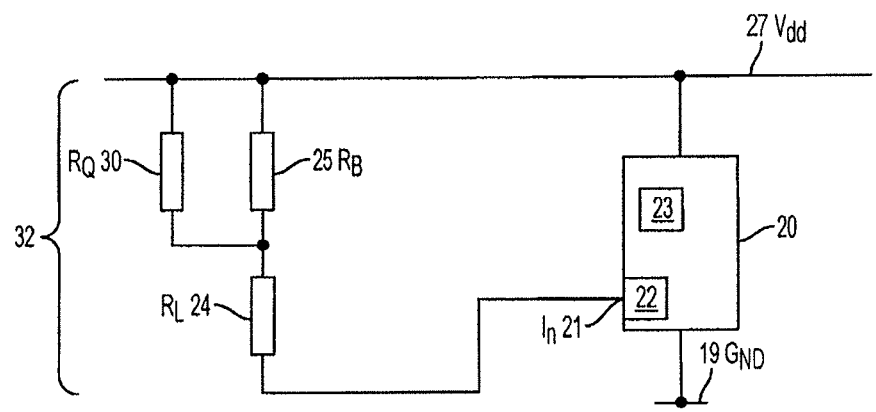
FIG. 3 is a circuit diagram of a first example of a force sensor useable together with the controller of a touch sensor.

With reference to FIG. 3, a first exemplary circuit 32 that includes a resistive force sensitive element 30 is shown and described. The circuit 32 is in communication with an input of a current integrator 22 of the control unit 20. The control unit 20 is connected to a ground rail 19 and a fixed voltage supply rail 27 that has a voltage $V_{dd}$. A resistive force sensitive element 30 having a value $R_Q$ is connected between the fixed voltage supply rail 27 and the current integrator input 21 of the control unit 20. The current integrator input 21 acts as a virtual earth having a voltage V. Having the resistive force sensitive element 30 and the control unit 20 both connected to the same voltage supply rail 27 allows the circuitry within the control unit 20, which measures the integrated current value, to be referenced to the voltage supply rail. This configuration may also allow the measurement to be made ratiometric and substantially decoupled from any changes in the supply rail voltage $V_{dd}$. Although the supply rail voltage $V_{dd}$ can be a fixed voltage, there may be unintended fluctuations in the supply rail voltage $V_{dd}$.

A limit resistor 24 having a value $R_L$ is connected in series with the resistive force sensitive element 30, between the fixed voltage supply rail 27, and the current integrator input 21. The limit resistor may, for example, have a resistance value in the range 100 Ω to 500 Ω. The limit resistor 24 $R_L$ limits the maximum current flow through the resistive force sensitive element 30 to the current integrator input 21 if the resistance of the resistive force sensitive element 30 drops to a low value. This configuration can prevent the current from exceeding a maximum value that can be accepted and measured by the current integrator 22. The resistance of some QTC materials can drop to a relatively low value when subjected to a large applied force.

A bias resistor 25 having a value $R_B$ is connected between the fixed voltage supply rail 27 and the limit resistor 24 in parallel with the resistive force sensitive element 30. In some instances, the resistance of some QTC materials can rise to a high value when not subjected to an applied force. The bias resistor 25 provides a DC current path if the resistance of the resistive force sensitive element 30 rises to a very high value. The bias resistor 25 may, for example, have a resistance value of 1 MΩ or more.

In this configuration, the value of the current flow $I_n$ into the integrator input 21 will be approximately: $I_n = (V_{dd} - V_n)/(((R_Q * R_B)/(R_Q + R_B)) + R_L)$.

In this example, each of the values in this equation other than $I_n$ and $R_Q$ are fixed. However, the current $I_n$ is a function of change in the force sensitive resistance $R_Q$. Accordingly, the resistance value $R_Q$ of the resistive force sensitive element can be determined from the value of the accumulated charge obtained by integration of $I_n$ over a fixed time as measured at the current integrator input 22. The value of the applied force can in turn be determined from the resistance value $R_Q$ of the resistive force sensitive element. The force can be calculated based on the characteristic of the QTC material using the calculated resistance. In some applications the force applied may not need to be accurately calculated; instead a simple threshold on the output of the integrator performing the force measurement may be sufficient to provide information to the host system.

The determined force can be used to cause certain events to occur in response thereto. For example, if the portable device is a mobile phone and the force applied to an area of the touch sensitive-position panel 1 exceeds a threshold value, then the mobile phone may perform a first action. For example, the menu of the mobile phone can return to a home screen. However, if the force does not exceed the threshold, then the menu may not change or a different action can occur. In addition, more than one threshold can be used to trigger various events. Some events can be triggered when a threshold is met and exceeded. Other events can be triggered when the force is below or equal to the threshold. Some events can be triggered when the threshold is exceeded. Other events can occur when the force is below the threshold. Still further actions can be performed based directly on the applied force Examples include, but are not limited to, a zoom-in action may be applied where the level of zoom being proportional to the applied force.

Figure 4:
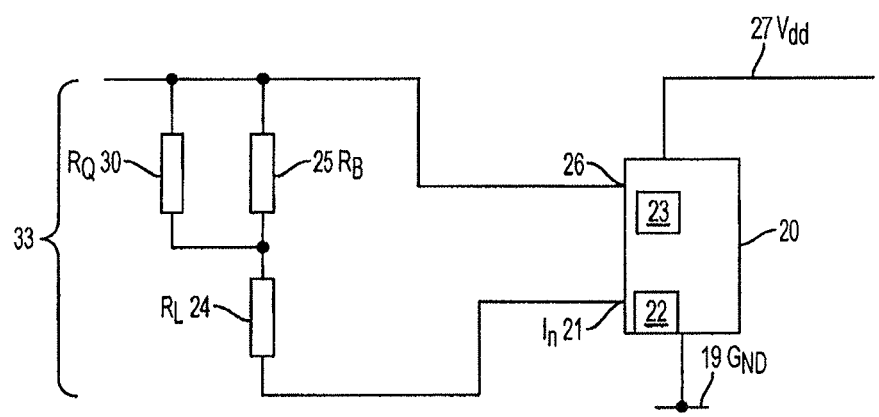
FIG. 4 is a circuit diagram of a second example of a force sensor useable together with the controller of a touch sensor.

With reference to FIG. 4, another circuit 33 that includes a QTC resistive force sensitive element 30 is shown and described. The resistive force sensitive element 30 is in communication with a control unit 20. The control unit 20 is connected to a ground rail 19 and a fixed voltage supply rail 27 that has a voltage $V_{dd}$.

In this example, the resistive force sensitive element 30 has a resistance $R_Q$ and is connected between a voltage driver output 26 of the control unit 20 and an input 21 of a current integrator 22 of the control unit 20. The voltage driver output 26 supplies an alternating voltage varying between a high voltage and a low voltage while the current integrator input 21 acts as a virtual earth at a voltage midway between the high and low voltages. In particular, the voltage driver output 26 supplies an alternating voltage varying between a high voltage substantially equal to the supply rail voltage $V_{dd}$ and a low voltage of substantially zero volts at ground, while the current integrator input 21 acts as a virtual earth at a voltage $V_n$ which is approximately half of $V_{dd}$. Although the alternating voltage is a positive voltage relative to the ground voltage, the alternating voltage is an alternating bi-polar voltage relative to the virtual earth at the current integrator input. The voltage driver can also drive one or more drive electrodes 4(X).

In this example, the current integrator input 21 voltage is nominally midway between the high and low voltages of the alternating voltage. However, other values of the current integrator input voltage between the high and low voltages could be used. The value of the current integrator input voltage will depend on how the alternating voltage varies with time.

In some examples, the voltage driver output 26 of the control unit 20 used to supply the alternating voltage to the resistive force sensitive element 30 may also be used to drive a drive electrode 4(X) of the touch position sensing panel 1. In such a configuration, the force sensor 30 may be shielded by being placed behind a conductive ground plane. Other types of shielding can also be used. Shielding can prevent capacitive coupling that can cause the force sensing element to become touch sensitive as well as force sensitive. In various applications this may be undesirable as the force sensor should respond to the force applied not to the proximity of the object applying the force.

Supplying the force sensing element 30 with an alternating voltage having values that are above and below the voltage of the current integrator input 21 can allow the circuits within the control unit 20 used to measure the integrated current value to carry out differential measurement of the current flow through the resistive force sensitive element 30. Such differential measurement may facilitate noise cancellation for some types of noise.

A limit resistor 24 having a resistance $R_L$ is connected between the voltage driver output 26 and the current integrator input 21. The limit resistor 24 is connected in series with the resistive force sensitive element 30.

A bias resistor 25 having a resistance $R_B$ is connected between the voltage driver output 26 and the limit resistor 24. The bias resistor 25 is connected in parallel with the resistive force sensitive element 30.

The resistance value $R_Q$ of the resistive force sensitive element can be determined from current values measured by differential current measurement at the input 21 of the current integrator 20. The value of the applied force can in turn be determined from the resistance value $R_Q$ of the resistive force sensitive element. The force can be determined based on the characteristics of the QTC material using the calculated resistance.

Figure 5:
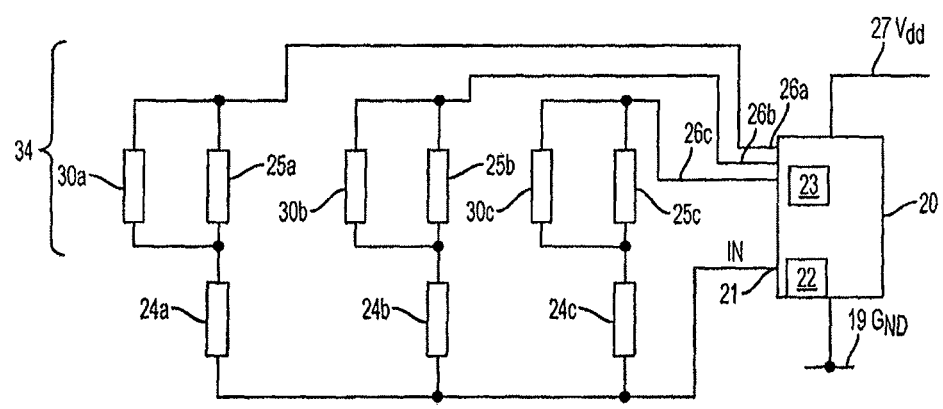
FIG. 5 is a circuit diagram of a third example of a force sensor useable together with a controller of a touch sensor.

With reference to FIG. 5, another example of a circuit 34 is shown and described. The circuit 34 includes three QTC resistive force sensitive elements 30a, 30b, and 30c in communication with the control unit 20. Also, the control unit 20 is connected to a ground rail 22 and a fixed voltage supply rail 27 that has a voltage $V_{dd}$.

In this example, each of the resistive force sensitive elements 30a, 30b, 30c is connected to a respective voltage driver output 26a, 26b, 26c of the control unit 20. All of the resistive force sensitive elements 30a, 30b, 30c, also are connected to an input 21 of a current integrator 22 of the control unit 20. Each voltage driver output 26a, 26b, 26c periodically supplies an alternating voltage varying between a high voltage and a low voltage. The current integrator input 21 acts as a virtual earth at a voltage midway between the high and low voltages. In particular, each voltage driver output 26a, 26b, 26c supplies an alternating voltage varying between a high voltage equal to the supply rail voltage $V_{dd}$ and a low voltage of zero volts at ground. In addition, the current integrator input 21 acts as a virtual earth at a voltage $V_n$ which is half of $V_{dd}$. In some examples, each voltage driver output 26a, 26b, 26c of the control unit 20 used to supply the alternating voltage to a resistive force sensitive element 30a, 30b, 30c may also be used to drive a drive electrode of the touch position sensing panel.

The timing of the periodic operation of the three voltage driver outputs 26a, 26b, 26c may be synchronized so that one of the three voltage driver outputs 26a, 26b, 26c is emitting an alternating voltage at any time. Accordingly, a single current integrator input 21 can measure the current flow through each of the resistive force sensitive elements 30a, 30b, 30c in turn.

A respective bias resistor 25a, 25b, 25c is connected between each voltage driver output 26a, 26b, 26c and a respective limit resistor 24a, 24b, 24c in parallel with a respective resistive force sensitive element 30a, 30b, 30c.

A respective bias resistor 25a, 25, 25c is connected between each voltage driver output 26a, 26b, 26c and a respective limit resistor 24a, 24b, 24c in parallel with a respective resistive force sensitive element 30a, 30b, 30c.

The resistance value of each resistive force sensitive element 30a, 30b, 30c can be determined from the respective current values determined by differential current measurement at the current integrator input 21 during the respective driver intervals. For each force sensing element 30a, 30b, 30c, the value of the applied force can in turn be determined from the determined resistance value of the respective resistive force sensitive element. The force can be determined based on the characteristics of the QTC material using the calculated resistance.

In this example, the resistance values of three resistive force sensitive elements 30a, 30b, 30c, are measured using a single current integrator input 21. Other numbers of current integrators 22 can also be used.

As shown, the resistance values of multiple resistive force sensitive elements 30a, 30b, 30c are measured using multiple voltage driver outputs 26a, 26b, 26c and a single current integrator input 21. In other examples, a single voltage driver output 26 and multiple current integrator inputs 21 could be used. In yet other examples, multiple voltage driver outputs 26 and multiple current integrator inputs 21 could be used. For example, N voltage driver outputs 26 and M current integrator inputs 21 could be arranged to measure N×M resistive force sensitive elements 30.

In the previous examples, limit resistors 26 are shown. However, limit resistors 26 may not be included if the characteristics of the resistive force sensitive element 30 are such that the resistance of the resistive force sensitive element is sufficiently high that the maximum current flow through the resistive force sensitive element is acceptable to the current integrator 22. Further, limit resistors 26 may not be used in the illustrated circuits if the current integrators 22 include an integral limit resistor.

In the illustrated examples, bias resistors 25 are used. However, bias resistors 25 may not be included if the characteristics of the resistive force sensitive element 30 are such that the resistance of the resistive force sensitive element 30 is sufficiently low that a DC current path through the resistive force sensitive element exists.

In the illustrated examples, force sensitive resistance elements 30 provide a force sensor. However, other types of resistive elements can also be used to provide additional sensing functionality. For example, light dependent resistance elements, infra red dependent resistance elements, or temperature dependent resistance elements can also be used. Each of these types of elements provides one or more additional sensing features in addition the position sensing provided by the drive electrodes 4(X) and sense electrodes 5(Y).

In the illustrated example, the drive electrodes 4(X) and the sense electrodes 5(Y) may be formed as two separate layers. However, other arrangements are possible. The mutual capacitance touch position sensor can alternatively be formed as a single layer device having co-planar drive electrodes and sense electrodes both formed on the same surface of a single substrate.

In the illustrated examples, the drive electrodes 4(X) and sense electrodes 5(X) may be rectangular strips. However, other arrangements are possible. The shape of the drive and sense electrodes and the interconnection between the channels of any given electrode may be modified according to the type of touch with which the position sensing panel is intended to be used. For example, the stripes may have saw-tooth or diamond shaped edges with attendant inter-stripe gaps to facilitate field interpolation to aid in smoothing positional response.

The number of drive electrodes and sense electrodes shown is by way of illustration only, and the number shown is not limiting.

While the above discussion used mutual capacitance drive approaches for the discussions of examples of the sensors that may incorporate force sensors, self-capacitance drive adapted to include force sensing by application of the technologies discussed in the examples above.

Various modifications may be made to the examples described in the foregoing, and any related teachings may be applied in numerous applications, only some of which have been described herein. It is intended by the following claims to claim any and all applications, modifications and variations that fall within the true scope of the present teachings.

What is claimed is:

1. An apparatus, comprising:
   a control unit comprising a voltage driver and an integrator circuit, the voltage driver operable to provide an alternating voltage;
   a touch sensing panel operable to communicate with the control unit;
   a first variable resistance element coupled to an output of the voltage driver and an input of the integrator circuit, wherein the integrator circuit is operable to measure a parameter of the first variable resistance element over a period of time, and wherein the first variable resistance element is operable to be driven by the alternating voltage provided by the voltage driver; and
   circuitry operable to determine, based on the measured parameter, an amount of force applied to a sensing area of the touch sensing panel.

2. The apparatus of claim 1, wherein the parameter is current flowing through the first variable resistance element.

3. The apparatus of claim 1, further comprising a bias resistance element connected in parallel with the first variable resistance element.

4. The apparatus of claim 1, further comprising a limiting resistance element connected in series with the first variable resistance element.

5. The apparatus of claim 1, wherein the output of the voltage driver comprises a first output and further comprising a second variable resistance element coupled with a second output of the voltage driver and the input of the integrator circuit.

6. The apparatus of claim 5, further comprising a bias resistance element connected in parallel with the second variable resistance element.

7. The apparatus of claim 5, further comprising a limiting resistance element connected in series with the second variable resistance element.

8. The apparatus of claim 1, wherein the input of the integrator circuit is at a voltage between a first voltage and a second voltage of the alternating voltage provided by the voltage driver.

9. The apparatus of claim 1, wherein the circuitry is operable to determine an amount of force applied to the sensing area using a differential measurement.

10. The apparatus of claim 1, wherein the circuitry is further operable to determine a location in a sensing area of the touch sensing panel associated with the determined amount of force.

* * * * *